United States Patent [19]
Iida

[11] Patent Number: 5,461,599
[45] Date of Patent: Oct. 24, 1995

[54] OPTICAL DISK SYSTEM

[75] Inventor: Makoto Iida, Osaka, Japan

[73] Assignee: Matsushita Electric Industrial Co., Ltd., Osaka, Japan

[21] Appl. No.: 279,318

[22] Filed: Jul. 22, 1994

Related U.S. Application Data

[63] Continuation of Ser. No. 866,166, filed as PCT/JP91/01549, Nov.13, 1991, abandoned.

[30] Foreign Application Priority Data

Nov. 14, 1990 [JP] Japan ............................ 2-309819

[51] Int. Cl.[6] ..................................................... G11B 7/00
[52] U.S. Cl. ..................................... 369/44.34; 369/44.32; 360/77.04
[58] Field of Search ........................... 369/44.32, 44.34, 369/44.41, 44.35, 44.36; 360/77.03, 77.04, 77.06, 77.07, 77.11

[56] References Cited

U.S. PATENT DOCUMENTS 3,881,184 4/1975 Koepcke et al. ............... 369/44.34
4,594,622 6/1986 Wallis .................................. 360/77.04
5,239,528 8/1993 Narahara et al. .................... 369/44.35

FOREIGN PATENT DOCUMENTS 0388958 9/1990 European Pat. Off. .
63-293614 11/1988 Japan .
1008729 1/1989 Japan .

*Primary Examiner*—Scott J. Sugarman
*Assistant Examiner*—P. W. Huber
*Attorney, Agent, or Firm*—Lowe, Price, LeBlanc & Becker

[57] ABSTRACT

A digital filter (5) filters outputs of an A/D converter (3). An adder (10) adds outputs from the digital filter (5) and delayed outputs from a delay (9). An extracting circuit takes out driving data (11) from the added data. Error data, which are remaining data of the added data after extraction of the driving data by the extracting circuit (6) are delayed a predetermined period of time by a delay (9) and inputted to the adder (10). A driving unit (9) drives an optical system (2) according to the driving data (11). The error data (12) are fed back and added to outputs of the digital filter (5), thereby improving accuracy in driving of the optical disk system and, as a result, obtaining reliable controllability and high accuracy in positioning in the optical disk system.

10 Claims, 4 Drawing Sheets

5,461,599

OPTICAL DISK SYSTEM

This is a continuation of application Ser. No. 07/866,166 filed Jun. 29, 1992 now abandoned.

TECHNICAL FIELD OF THE INVENTION

The present invention relates to an optical disk system for a compact disk, a laser disk or the like.

BACKGROUND ART

Many products relating to optical disks have appeared on the market in recent years. In addition to the spread of compact disk players for domestic and personal use, reduction of a price of a compatible player being capable of playing a plural kinds of optical disks such as a laser disk, a compact disk and the like accelerates the spread of such the products. With respect to soft ware, soft war having a good quality and a low price appear, being going to take a leading part in a field of AV (audio visual), comparable to video. On the other hand, the optical disk is applied to a field of computer as a ROM (a read only memory), utilizing its large storage capacity and high accessibility. The use of the optical disk will widely expand in future by reason of the spread of an optical disk of a direct-read-after-write type which can be overwritten.

Data of the optical disk are typically arranged spirally from an inner periphery to an outer periphery of the disk as pits and the data are determined depending on presence of the pit. A role of the optical servo is to focus rays of light emitted from an optical system onto a predetermined array of the pits upon reproduction of data of the optical disk to bring the data into a readable state. The optical servo is classified into a focus servo which serves to focus the optical system onto a surface of an optical disk and a tracking servo which positions beams for reproducing information onto an array of pits on a surface of an optical disk.

There is a conventional optical disk system (Japanese Patent Application No. SHO 63-293614, Application Date; May 27, 1987, Title of the Invention; Position Controlling System).

In the conventional optical disk system, error signals are processed by a digital filter, then rounded to eight bits to be used as driving data. Lower-order data are lost because of the rounding.

The conventional optical system, therefore, has a problem that it is difficult to ensure sufficient accuracy in the system since the driving data are rounded to eight bits.

An object of the present invention is to overcome the above problem and to provide an optical disk system having a good control characteristic.

DISCLOSURE OF THE INVENTION

The present invention, therefore, provides an optical disk system comprising an optical system applying light beams on an optical disk to produce focus error signals on the basis of reflected light beams thereof, an A/D converter converting the focus error signals from an analog form to a digital form, a digital filter filtering outputs from the A/D converter, an adder means adding outputs of the digital filter and delayed outputs, an extracting means taking out driving data from the added data, a delay means delaying error data which are outputs remaining upon extracting the driving data by the extracting means a predetermined period of time to output them as delayed outputs, and a driving means driving the optical system according to the driving data which are outputs of the extracting means.

In the above structure, the error data are fed back and added to be utilized, whereby accuracy of the driving data may be improved and, thereby, a control characteristic of the system may be improved.

BEST MODE FOR CARRYING OUT THE INVENTION

An embodiment of the present invention will now be described with reference to the accompanying drawings.

Figure 1:
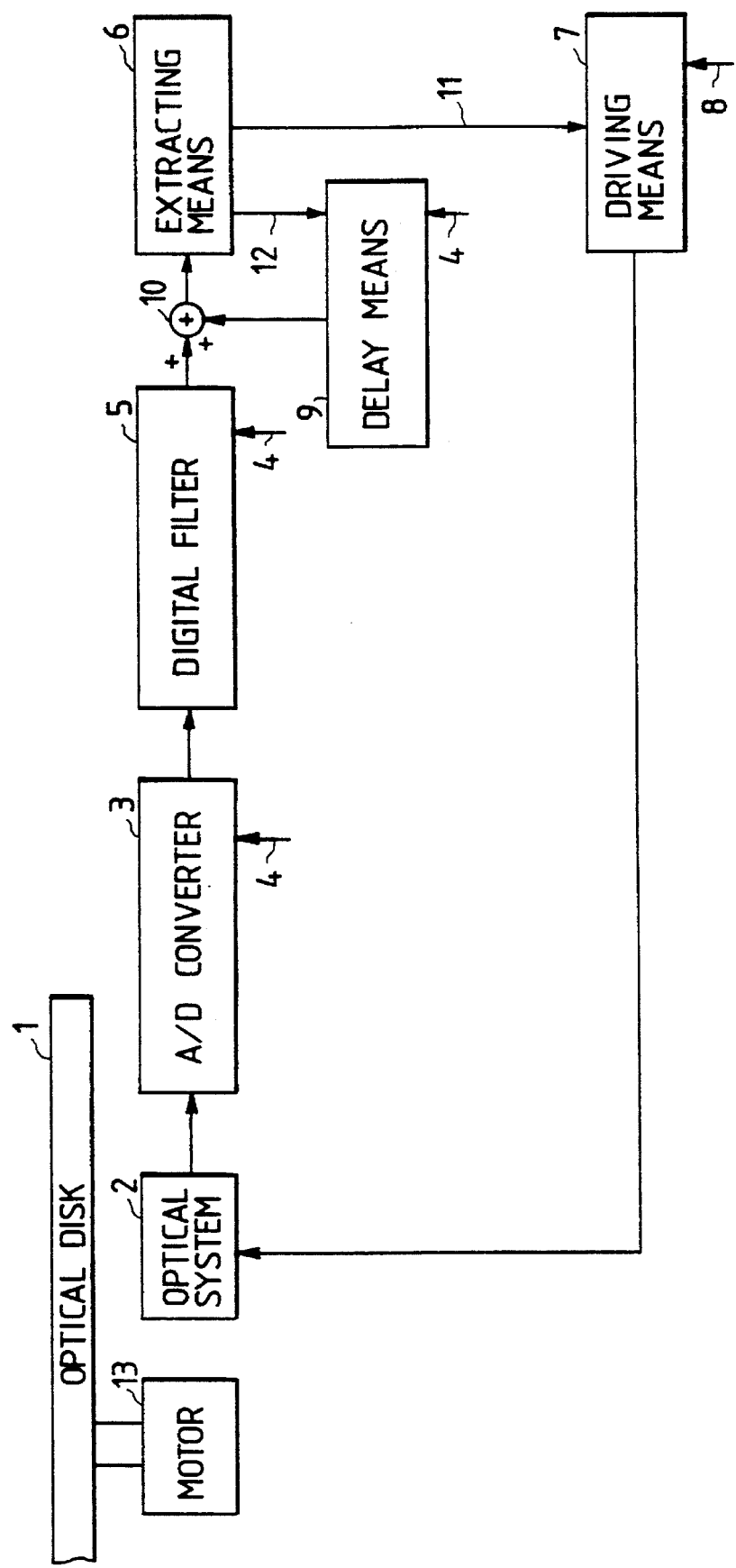
FIG. 1 is a block diagram showing a structure of an optical disk system of an embodiment according to the present invention.
Figure 2:
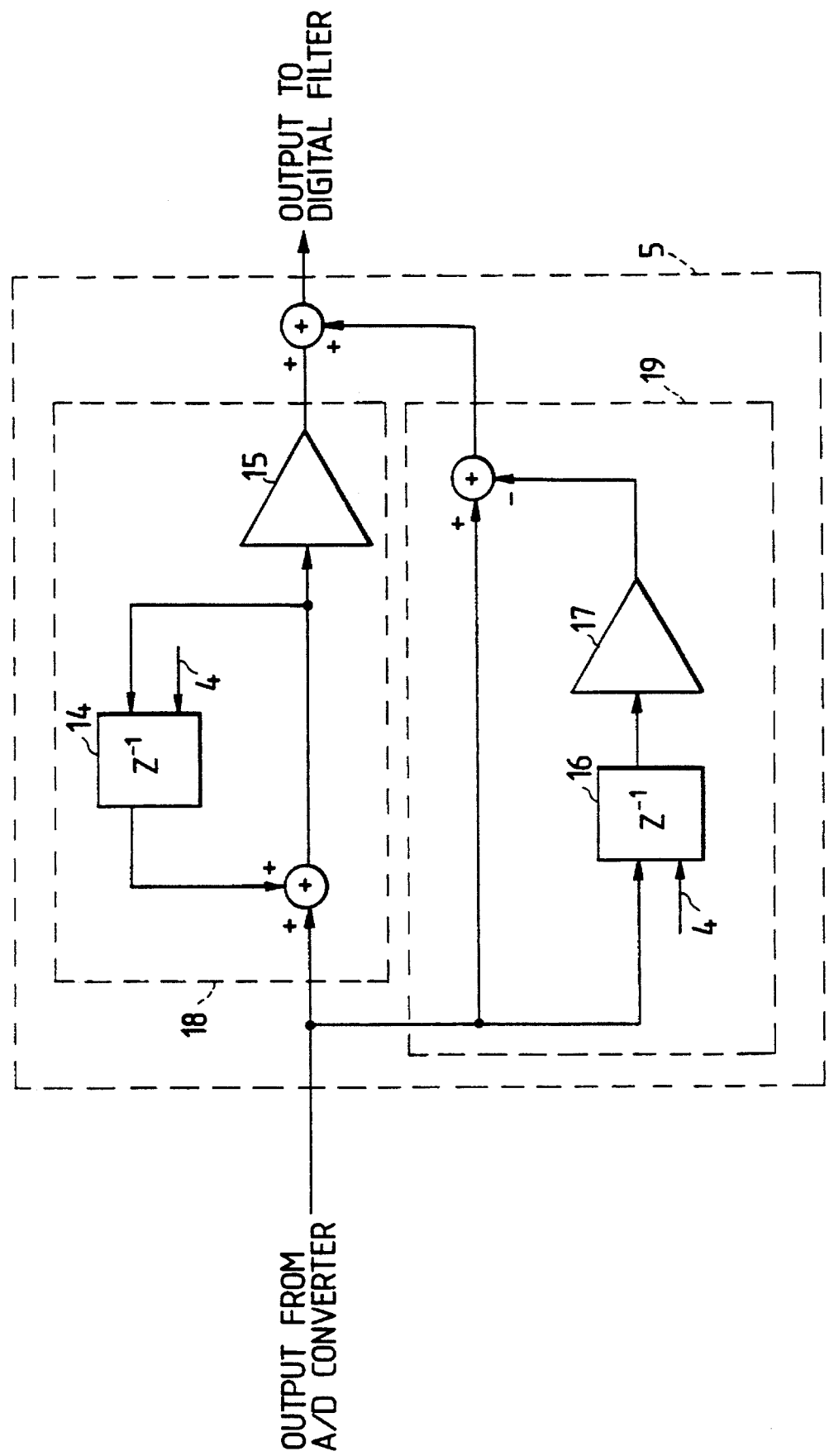
FIG. 2 is a block diagram showing an internal structure of a digital filter 5 shown in FIG. 1.

FIGS. 1, 2, 3(*b*) and 4(*b*) show the embodiment of the present invention.

FIG. 1 is a block diagram showing a structure of an optical disk of the embodiment according to the present invention, in which reference numeral 1 denotes an optical disk which is a medium recorded information therein, 2 an optical system which applies light beams onto the optical disk 1 to produce focus error signals by receiving the reflected beams, 3 an A/D converter which is inputted the focus error signals to convert them from an analog form to a digital form, 4 sampling clocks which are adapted to sample the focus error signals, to latch values in a register in the digital filter 5, and to latch truncation data (error data) which are inputs of a delay means 9, a digital filter which is inputted the A/D-converted data to filter them for compensation in a low and a high band, 10 an adder means which adds an output of the digital filter 5 and an output of the delay means 9, 6 an extracting means which is inputted data added by the adding means 10 and separates them to take therefrom out driving data 11, which is effective for controlling a driving means 7 which latches the effective driving data 11 by means of a latching clock 8 to output a driving signal, 9 a delay means to which is inputted the data (error data) rounded down by the extracting means 6 to obtain a delayed output by latching by means of a sampling clock 4, and 13 a motor which rotates the optical disk.

Operation of the optical disk system of this embodiment with the structure set forth above will be described next.

A focus of the light beams emitted from the optical system 2 is on the optical disk 1 or thereabout in a normal focus servo state, and a loop is formed so as to decrease an absolute value of the focus error signal. The focus error signal obtained from the optical system 2 is converted from an analog into a digital form by the A/D converter 3. A sampled frequency is, here, converted into eight-bit data at a frequency of 44.1 KHz. The converted eight-bit data are inputted to the digital filter 5 to be filtered. The digital filter 5 performs filtering for compensation in a low and a high band.

FIG. 2 is a block diagram showing a structure of the digital filter 5, to which is. The digital filter 5 inputted the eight-bit data, is made up of a low-pass filter section 18 and a high-pass filter section 19 disposed in parallel, and adds outputs of both the filters to output a result. The low-pass filter section 18 is provided with a register for a low band term to carry out an accumulative addition. The added data are multiplied by a coefficient for the low band term 15 to be data for the low band. On the other hand, the high-pass filter section 19 is provided with a register for the high band term, and data delayed one sample are multiplied by a coefficient for the high band term 17 to be outputted as a difference between the result and the present sampled data. The digital filter 5 then adds an output of the high-pass filter section 19 and an output of the low-pass filter section 18 to output an added result.

The output data from the digital filter 5 are added to the output from the delay means 9 by the adding means 10 and inputted to the extracting means 6. Incidentally, the registers 14 and 16 for the high band term and the low band term, are shifted by the sampling clocks 4.

The extracting means 6 serves to take out the driving data 11 (eight bits) from the data added by the adder means 10, the lower-order bits being omitted in this embodiment. Although the gain is varied depending on this taking-out position, this position is set on the basis of the characteristics of the servo loop. The driving means 7 is inputted the driving data 11 (eight bits) which are the output data from the extracting means 6 to perform pulse duration modulation on the basis of the eight-bit data latched by the latching clock 8.

By the way, the pulse-duration modulation is also performed at a frequency of 44.1 KHz. When the data are positive, a positive voltage is continuously applied during a period of time proportional to a magnitude of an absolute value of the data. When a positive voltage is applied, the optical system 2 is caused to be driven in a direction so as to decrease the focus error signals. When the data are negative, a negative voltage is applied during a period of time proportional to a magnitude of an absolute value of the data. When a negative voltage is applied, the optical system 2 is caused to be driven in a direction so as to increase the focus error signals. In this way, the focus servo is carried out owing to the operation of the closed loop.

In this embodiment, the delay means 9 and the adder means 10 are newly provided as structural elements, to which the omitted data (error data) 12 which have been omitted by the extracting means 8 are inputted to be added to the output of the digital filter 5 after delay of one sample, whereby the data which are omitted heretofore are used. Although the data are behind one sample at this time, it is necessary that the data are effective even if being delayed. In which case, since a frequency caused by vertical deflection of the surface of the optical disk 1 (from several hertz to several tens of hertz) is sufficiently lower than the sampling frequency (44.1 KHz), the data delayed one sample are effective. Therefore, the data which have been omitted are utilized, whereby accuracy of the driving data is improved.

Figure 3A:
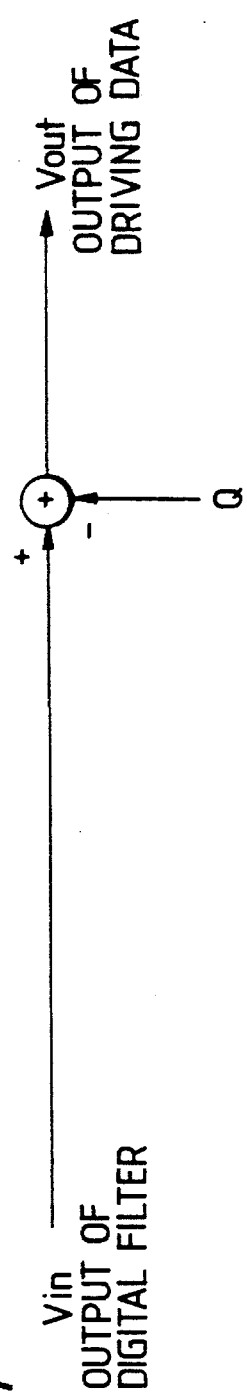
FIGS. 3(*a*) and 3(*b*) are a block diagram showing a route from output of the digital filter 5 to output of driving data 10.
Figure 3B:
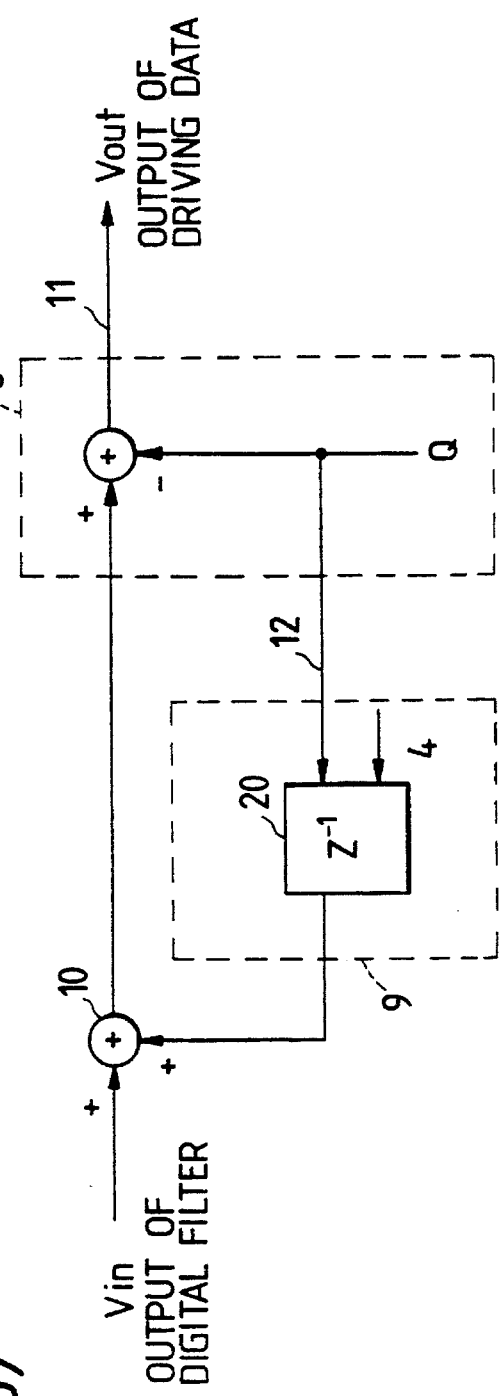

FIGS. 3(a) and 3(b) illustrate how the accuracy of the driving data are improved. FIGS. 3(a) and 3(b) are block diagrams showing a route from the output of the digital filter to the output of the driving data 11, FIG. 3(a) showing a conventional manner, while FIG. 3(b) showing this embodiment. The conventional manner is represented by a formula:

$$Vout = Vin - Q$$

where

Vin: an output of the digital filter;

Vout: an output of the driving data; and

Q: an error obtained by the extraction.

On the other hand, this embodiment is represented by a formula:

$$Vout = Vin - Q(1 - Z^{-1})$$

where $Z^{-1} = \exp(j\omega t)$, a delayed element represent by z transform;

where j: a unit of imaginary number;

$\omega$: an angular frequency ($\omega = 2\pi f$, where $\pi$: the value of of the ratio of the circumference of a circle to its diameter, and f: a frequency); and t: a sampling cycle (where $t = 1/44100$).

Figure 4C:
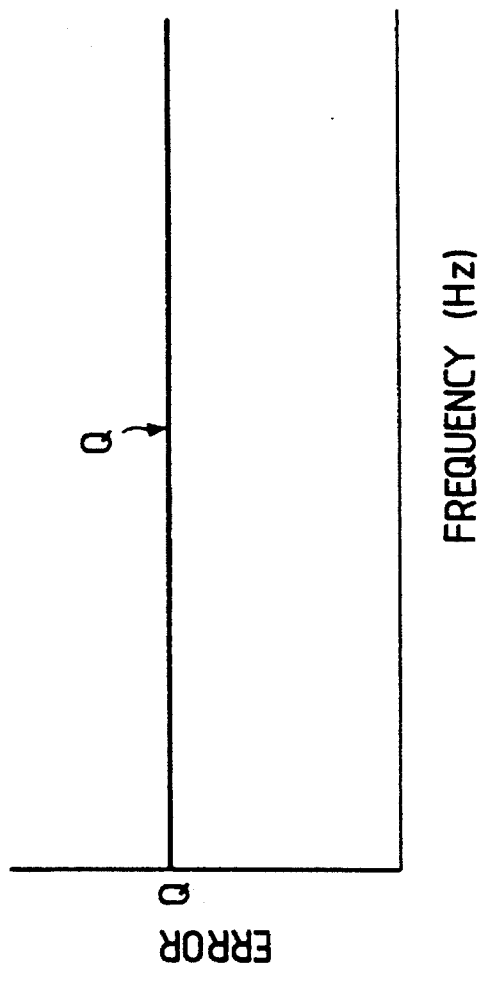
FIGS. 4(*a*) and 4(*b*) are an illustration showing frequency characteristics of errors.
Figure 4D:
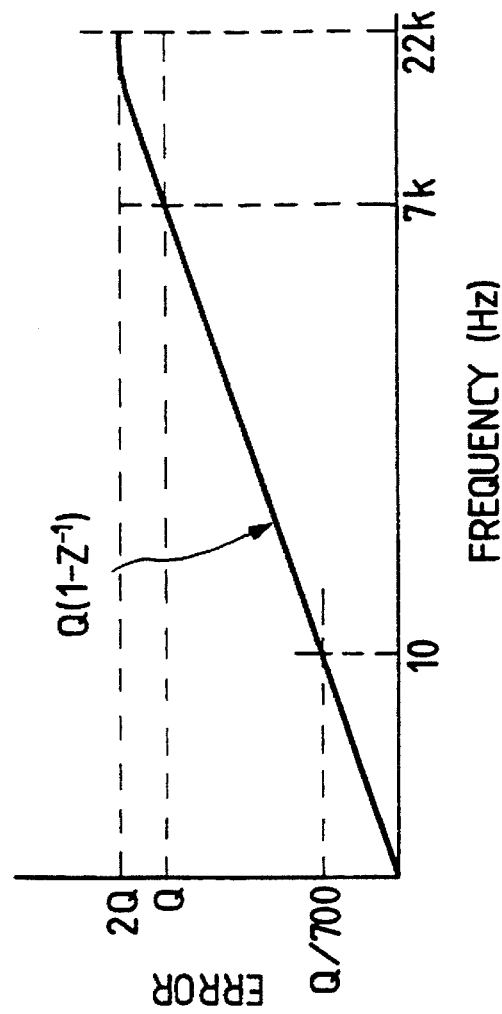

Frequency characteristic of the errors is a constant Q in the conventional manner as shown in FIG. 4(a), but is varied in this embodiment as shown in FIG. 4(b). The errors in this embodiment at a frequency of 10 Hz of the vertical deflection of optical disk surface are approximately 1/100 of those in the conventional system, which shows remarkable improvement in effect. The errors increase in the vicinity of 7 KHz, but this affects a little to the focus servo since the gain-crossover frequency of the focus servo is about 750 Hz to 2.5 KHz and the gain is largely decreased than 1 at a frequency of 7 KHz or higher.

This embodiment performed on the focus servo, but it is possible to modify a tracking servo in the same manner such that the focus error signals are replaced with tracking error signals.

The data rounded down are used as the error data in this embodiment, but when the lower-data are raised to a unit or rounded, the corresponding errors may be used as the error data by the extracting means, whereby the same effect may be obtained.

Industrial Applicability

As having been described, the present invention provides an optical disk system comprising an optical system applying light beams onto an optical disk to produce focus error signals on the basis of reflected light beams thereof, an A/D converter converting the focus error signals from an analog form to a digital form, a digital filter filtering outputs from the A/D converter, an adder means adding outputs from the digital filter to delayed outputs, an extracting means taking out driving data from the added data, a delay means delaying error data which are remaining output of the added data upon taking out the driving data from the added data by the extracting means a predetermined period of time to output them as delayed outputs, and a driving means driving the optical system according to the driving data which are outputs of the extracting means. According to the present invention, the error data are fed back and added so as to be effectively utilized, thereby increasing the accuracy of the driving data and improving the control characteristic.

I claim:

1. An optical disk system comprising:

an optical system applying light beams on an optical disk to produce focus error signals on the basis of reflected light beams thereof;

an A/D converter converting said focus error signals from an analog from to a digital form;

a digital filter filtering output data from the A/D converter;

an adder means adding output data from the digital filter and output data from a delay means;

an extracting means connected to receive data from the adder means and to output driving data as a first output to driving means and to output error data as a second output to said delay means;

said delay means delaying said error data forming the second output from the extracting means by a predetermined period for output to said adder means; and said driving means driving said optical system in a vertical direction in respect to a surface of said optical disk in response to the driving data.

2. An optical disk system comprising:

an optical system applying light beams on an optical disk to produce tracking error signals on the basis of reflected light beams thereof;

an A/D converter converting said tracking error signals from an analog form to a digital form;

a digital filter filtering output data from the A/D converter;

an adder means adding output data from the digital filter and output data from a delay means;

an extracting means connected to receive data from the adder means and to output driving data as a first output to a driving means and to output error data as a second output to said delay; means;

said delay means delaying said error data forming the second output from the extracting means by a predetermined period for output to said adder means; and said driving means driving said optical system in a radial direction in respect to a surface of said optical disk in response to the driving data.

3. In an optical disk system including an optical system for applying light beams to an optical disk and producing an optical error signal based on light beans reflected from the optical disk, and A/D converter sampling said optical error signal at a predetermined sampling frequency for converting said optical error signal from an analog form to a digital form and for outputting digital output data representing said optical error signal; digital filter means for filtering said digital output data to produce filtered data for driving a driving means, wherein said driving means drives said optical system in a predetermined direction relative to said optical disk, and extracting means for extracting from said filtered data a first portion having a predetermined number of bits effective for driving said driving means, while discarding a second portion of said filtered data, the improvement comprising:

delay means connected for receiving said second portion of said filtered data discarded by said extracting means, and for outputting a delayed second portion of said filtered data delayed by a predetermined delay period, and feedback loop means for feeding back the delayed second portion of said filtered data outputted from said delay means to said extracting means, wherein said feedback loop means comprises adding means having two inputs and an output, a first input of said adding means connected for receiving said filtered data from said digital filter means, a second input of said adding means connected for receiving said delayed second portion of said filtered data, and said output of said adding means connected for outputting a sum of said filtered data and said delayed second portion of said filtered data to said extracting means, thereby improving accuracy of said driving data.

4. An optical disk system as recited in claim 3, wherein said delay means comprises means for delaying said second portion of said filtered data discarded by said extracting means by a predetermined number of cycles of said predetermined sampling frequency.

5. An optical disk system as recited in claim 3, wherein said delay means comprises means for delaying said second portion of said filtered data discarded by said extracting means by one sample time representing a single cycle of said predetermined sampling frequency.

6. An optical disk system as recited in claim 3, wherein said optical system comprises means for producing optical focusing error signals representing an error in a vertical direction relative to a surface of said optical disk.

7. An optical disk system as recited in claim 3, wherein said optical system comprises means for producing optical tracking error signals representing a tracking error relative to a surface of said optical disk.

8. An optical disk system as recited in claim 3, wherein said extracting means operates for extracting from said filtered data a first portion having a predetermined number of the most significant bits thereof and for providing a remaining portion of least significant bits thereof to said delay means as said second portion.

9. An optical disk system as recited in claim 3, wherein said extracting means operates for performing a rounding operation on said filtering data and for providing to said delay means as said second portion a remaining portion of least significant bits thereof discarded in said rounding operation.

10. An optical disk system as recited in claim 3, wherein said extracting means performs a truncating operation on said filtered data for truncating a predetermined number of least significant bits of said filtered data and for providing to said delay means as said second portion the least significant bits thereof discarded in said truncating operation.

* * * * *